Sept. 15, 1936.    W. PIERPOINT    2,054,730
ROACH TRAP
Filed May 25, 1934

Walter Pierpoint
INVENTOR
BY
ATTORNEY

Patented Sept. 15, 1936

2,054,730

UNITED STATES PATENT OFFICE 2,054,730

ROACH TRAP

Walter Pierpoint, Alexandria, Va.

Application May 25, 1934, Serial No. 727,557

2 Claims. (Cl. 43—121)

The invention relates to insect traps and more especially to roach traps.

The primary object of the invention is the provision of a trap of this character, wherein through the medium of a box-like body and removable runways roaches or the like pests can be conveniently caught for the easy extermination of the same, the trap in its make-up being novel in form.

Another object of the invention is the provision of a trap of this character, wherein roaches when crawling upon the floor or other foundation or walls can be enticed to enter the trap for imprisoning therein, so that such pests or the like can be exterminated, the roaches or the like on entering the trap cannot make escape therefrom, so that there is no chance of freedom and by such confinement can be readily and easily done away with.

A further object of the invention is the provision of a trap of this character, wherein the same can be placed in working position against a wall or base board or at a corner of an enclosure, so that roaches or other like pests will be positively caught and held by the trap for the killing of the same, the trap being readily portable and is susceptible for use at any locality in the open or within a room or like enclosure.

A still further object of the invention is the provision of a trap of this character, which is extremely simple in construction, thoroughly reliable and efficient in its operation, light in weight, yet strong, durable, conveniently carried from one place to another, sanitary, easily cleaned, and inexpensive to manufacture.

With these and other objects in view the invention consists in the features of construction, combination and arrangements of parts as will be hereinafter more fully described, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
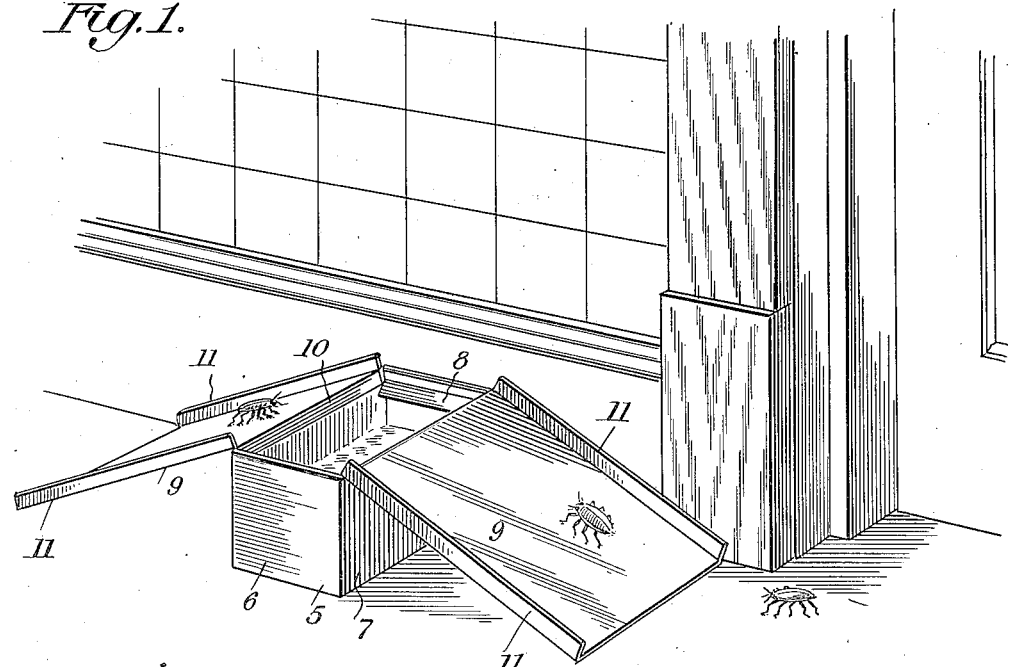
Figure 1 is a perspective view of the trap constructed in accordance with the invention.
Figure 2:
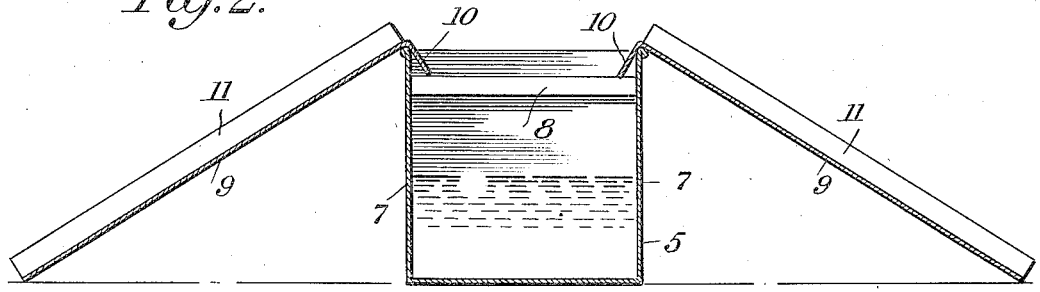
Figure 2 is a vertical sectional view thereof.
Figure 3:
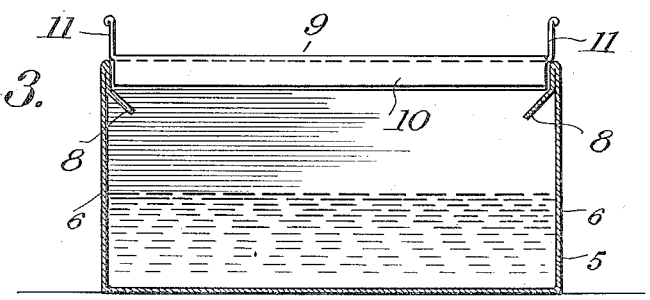
Figure 3 is a transverse sectional view.

Referring to the drawing in detail, the trap comprises a box-like body 5, preferably substantially of rectangular shape, although it may be of any other shape to present flat vertical side and end walls 6 and 7, respectively. This body 5 is desirably made from sheet tin, but it can be made from other materials if desired. The opposite side walls 6 of this body 5 at the top edge thereof have the comparatively narrow sloping or inwardly inclined ledges 8, these being cut and bent from the blank forming the body 5 and constitute guards. It will be understood that the body is entirely open at its top, and the upper edges of the end walls 7 are straight and devoid of ledges.

For association with the body 5 are entrance plates or run-ways 9, there being two, which are adapted to rest against the top edges of the end walls 7 so as to be inclined toward the floor or other foundation with the lower edges of said plates or run-ways resting thereon. At the upper edges of these plates are the angular ledges 10, these being inclined or inwardly sloping identically with the ledges 8 and overhang the upper or top edges of the end walls of the body 5 to match the said ledges 8 on the side walls 6 of the latter and constitute guards.

The side edges of the plates or run-ways 9 are provided with upstanding flanges 11, these being co-extensive with the length of said plates or run-ways and function as side guards thereto.

In the use of the trap the body 5 is set in position to have one side wall 6 of the same contact with the wall of an enclosure or the base board therefor, whereupon the plates or run-ways 9 are disposed to have their upper portions rest upon the top edges of the end walls 7 of the body 5 with the ledges 10 contacting with the top edges of the said walls 7 and overhanging the open top of the body to match with the ledges 8 of the side walls 6 thereof. The lower ends of the plates or run-ways will be brought to rest upon the floor or foundation for the enclosure.

It is of course understood that there is placed within the body 5 a suitable bait for enticing roaches or other like pests within and the latter will crawl up the plates or run-ways for entrance to the body or they will crawl upon the wall of the enclosure and make entrance to the body 5 therefrom by way of the ledge 8 next thereto. The roaches or the like on crawling upon the ledges 8 and 10 will fall therefrom into the said body and thus become trapped therein. It is impossible for the roaches caught within the trap to make an exit therefrom as the ledges 8 and 10, respectively function as a barrier for so doing. The trapped insects can be killed in any desirable manner.

It should be apparent that the body 5 can be placed at a corner of a room or the like and in using the trap in this manner only one of the plates or run-ways 9 will be brought into use, as one side wall 6 and one end wall 7 will make contact with the meeting walls of the room or the like and roaches or the kind will be successfully trapped for their extermination.

What is claimed is:

1. In a trap of the kind described, a box-like receptacle open at the top and having opposite vertical walls, two of said opposite walls having upper inwardly folded ends, said folds extending from the upper edge of said walls vertically downwardly and in converging relation to each other, and runways having side flanges and each runway having an end flange, each end flange being turned downwardly and resting on an upper edge of a wall of the receptacle and extending inwardly in converging relation to the end flange of the opposite runway, the side flanges of the runways being at right angles to the floors of the runways said side flanges of the runways and vertical inner portions of the folded ends lying in substantially the same vertical plane whereby when the trap is placed with its side flanges and folded end in adjacent relation to an abutting wall said flanges and folded end will direct insects towards the supporting surfaces leading to the central portion of the trap.

2. In a trap of the kind described, a box-like receptacle open at the top and having opposite vertical walls, two of said opposite walls having upper inwardly folded ends, said folds extending from the upper edge of said walls vertically downwardly and in converging relation to each other, and a runway having side flanges and an end flange, the end flange being turned downwardly and resting on an upper edge of a wall of the receptacle and extending inwardly the side flanges of the runway being at right angles to the floor of said runway, said side flanges of the runway and the inner portions of the folded ends lying in substantially the same vertical plane, whereby when the trap is placed at a corner of an enclosure with one of the side flanges and an adjacent folded end in contacting relation to an abutting wall, said flanges and folded end will direct insects towards supporting surfaces leading to the central portion of the trap.

WALTER PIERPOINT.